(12) United States Patent
Coish et al.

(10) Patent No.: US 8,309,245 B2
(45) Date of Patent: Nov. 13, 2012

(54) BATTERY PACK AND CONNECTOR

(75) Inventors: Robert L. Coish, Mountain View, CA (US); Chris Ligtenberg, San Carlos, CA (US); Ron Hopkinson, Campbell, CA (US); John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 12/549,570

(22) Filed: Aug. 28, 2009

(65) Prior Publication Data

US 2010/0310931 A1    Dec. 9, 2010

Related U.S. Application Data

(60) Provisional application No. 61/184,795, filed on Jun. 6, 2009.

(51) Int. Cl.
*H01M 2/10* (2006.01)
(52) U.S. Cl. .................................................. 429/100
(58) Field of Classification Search ............ 429/96, 429/99, 100, 158–160, 176, 177
See application file for complete search history.

(56) References Cited

U.S. PATENT DOCUMENTS

| | | | |
|---|---|---|---|
| 2,964,887 A | 12/1960 | G.H. Orozco | |
| 3,517,466 A | 6/1970 | J.J. Bouvier | |
| 4,258,596 A * | 3/1981 | Bisbing et al. | 81/436 |
| 4,766,746 A | 8/1988 | Henderson et al. | |
| 5,237,486 A | 8/1993 | LaPointe et al. | |
| 5,302,110 A * | 4/1994 | Desai et al. | 429/96 |
| 5,531,950 A | 7/1996 | Kimura et al. | |
| 5,606,438 A | 2/1997 | Margalit et al. | |
| 5,611,517 A | 3/1997 | Saadi et al. | |
| 5,795,430 A | 8/1998 | Beeteson et al. | |
| 5,828,341 A | 10/1998 | Delamater | |
| 5,881,103 A | 3/1999 | Wong et al. | |
| 6,014,080 A | 1/2000 | Layson, Jr. | |
| 6,068,946 A * | 5/2000 | Zedell et al. | 429/100 |
| 6,122,167 A | 9/2000 | Smith et al. | |
| 6,151,012 A | 11/2000 | Bullister | |
| 6,179,122 B1 | 1/2001 | Moncrief et al. | |
| 6,218,041 B1 * | 4/2001 | Barbier et al. | 429/96 |
| 6,532,152 B1 | 3/2003 | White et al. | |
| 6,542,384 B1 | 4/2003 | Radu et al. | |
| 6,724,616 B2 | 4/2004 | Kuo et al. | |

(Continued)

FOREIGN PATENT DOCUMENTS

EP    0 683 026 B1    3/2001

(Continued)

OTHER PUBLICATIONS

Block "MacBook Air Review", http://www.engadget.com/2008/01/25/Marcbook-air-review, Jan. 25, 2008.

(Continued)

*Primary Examiner* — Ula C. Ruddock
*Assistant Examiner* — Thomas H. Parsons
(74) *Attorney, Agent, or Firm* — Womble Carlyle Sandridge & Rice LLP

(57) ABSTRACT

By being embedded in a portable computing device, a battery pack is made essentially inaccessible to unauthorized users, thereby allowing for a battery pack that can be made smaller and of lighter construction material, thereby facilitating greater component density within the portable computing device, lower cost to manufacture, and more environmentally secure.

14 Claims, 13 Drawing Sheets

U.S. PATENT DOCUMENTS

| | | |
|---|---|---|
| 6,791,465 B2 | 9/2004 | Blagin et al. |
| 6,846,228 B2 | 1/2005 | Lin |
| 6,876,543 B2 | 4/2005 | Mockridge et al. |
| 6,914,773 B2 | 7/2005 | Yang et al. |
| 6,967,833 B2 | 11/2005 | Boykin et al. |
| 6,999,826 B1 | 2/2006 | Zhou et al. |
| 7,330,122 B2 | 2/2008 | Derrick et al. |
| 7,342,792 B2 | 3/2008 | Kim et al. |
| 7,369,191 B2 | 5/2008 | Okamoto et al. |
| 7,522,889 B2 | 4/2009 | Wulff et al. |
| 7,535,547 B2 | 5/2009 | Tannas, Jr. |
| 7,545,574 B2 | 6/2009 | Park et al. |
| 7,697,281 B2 | 4/2010 | Dabov et al. |
| 7,817,407 B2 | 10/2010 | Tanaka |
| 7,855,874 B2 | 12/2010 | Nakajima et al. |
| 7,871,720 B2 * | 1/2011 | Myers et al. .................. 429/123 |
| 2002/0037686 A1 | 3/2002 | Brown et al. |
| 2002/0048148 A1 | 4/2002 | Horiuchi et al. |
| 2003/0048605 A1 | 3/2003 | Kyozuka et al. |
| 2003/0197111 A1 | 10/2003 | Morimoto et al. |
| 2005/0069667 A1 | 3/2005 | Wacker |
| 2006/0002065 A1 | 1/2006 | Hua |
| 2006/0018087 A1 | 1/2006 | Mizuno et al. |
| 2006/0082956 A1 | 4/2006 | Garel et al. |
| 2006/0109619 A1 | 5/2006 | Ito et al. |
| 2006/0268528 A1 | 11/2006 | Zadesky et al. |
| 2007/0019372 A1 | 1/2007 | Wong et al. |
| 2007/0148537 A1 | 6/2007 | Nakatani et al. |
| 2007/0165373 A1 | 7/2007 | Merz et al. |
| 2008/0026614 A1 | 1/2008 | Emerson et al. |
| 2008/0081254 A1 * | 4/2008 | Kim et al. .................... 429/163 |
| 2008/0237477 A1 | 10/2008 | Hoggatt et al. |
| 2009/0088055 A1 | 4/2009 | Silva et al. |
| 2009/0146279 A1 | 6/2009 | Griffin |
| 2009/0175001 A1 | 7/2009 | Mathew et al. |
| 2009/0183819 A1 | 7/2009 | Matsuhira |
| 2010/0061040 A1 | 3/2010 | Dabov et al. |
| 2010/0061055 A1 | 3/2010 | Dabov et al. |
| 2010/0259891 A1 | 10/2010 | Tachikawa |
| 2010/0310931 A1 | 12/2010 | Coish et al. |
| 2011/0019353 A1 | 1/2011 | Tanaka |
| 2011/0090627 A1 | 4/2011 | Raff et al. |

FOREIGN PATENT DOCUMENTS

| | | |
|---|---|---|
| EP | 0 911 717 B1 | 3/2003 |
| EP | 1 621 967 | 2/2006 |
| JP | 2003-174492 | 6/2003 |
| WO | WO 2009/126480 | 10/2009 |

OTHER PUBLICATIONS

PowerBook G4 (15-Inch FW 800): Sound Specifications, http://support.apple.com/kb/TA27151?viewlocale=en_US, Jan. 8, 2007.

Int'l Search Report dated May 10, 2011 from Int'l Application No. PCT/US2010/052563.

Written Opinion dated May 10, 2011 from Int'l Application No. PCT/US2010/052563.

Partial Search Report dated Feb. 15, 2011 from Int'l Application No. PCT/US2010/052563.

Ex parte Quayle Action for U.S. Appl. No. 12/580,976 dated Apr. 4, 2012.

Notice of Allowance for U.S. Appl. No. 12/580,976 dated Apr. 16, 2012.

* cited by examiner

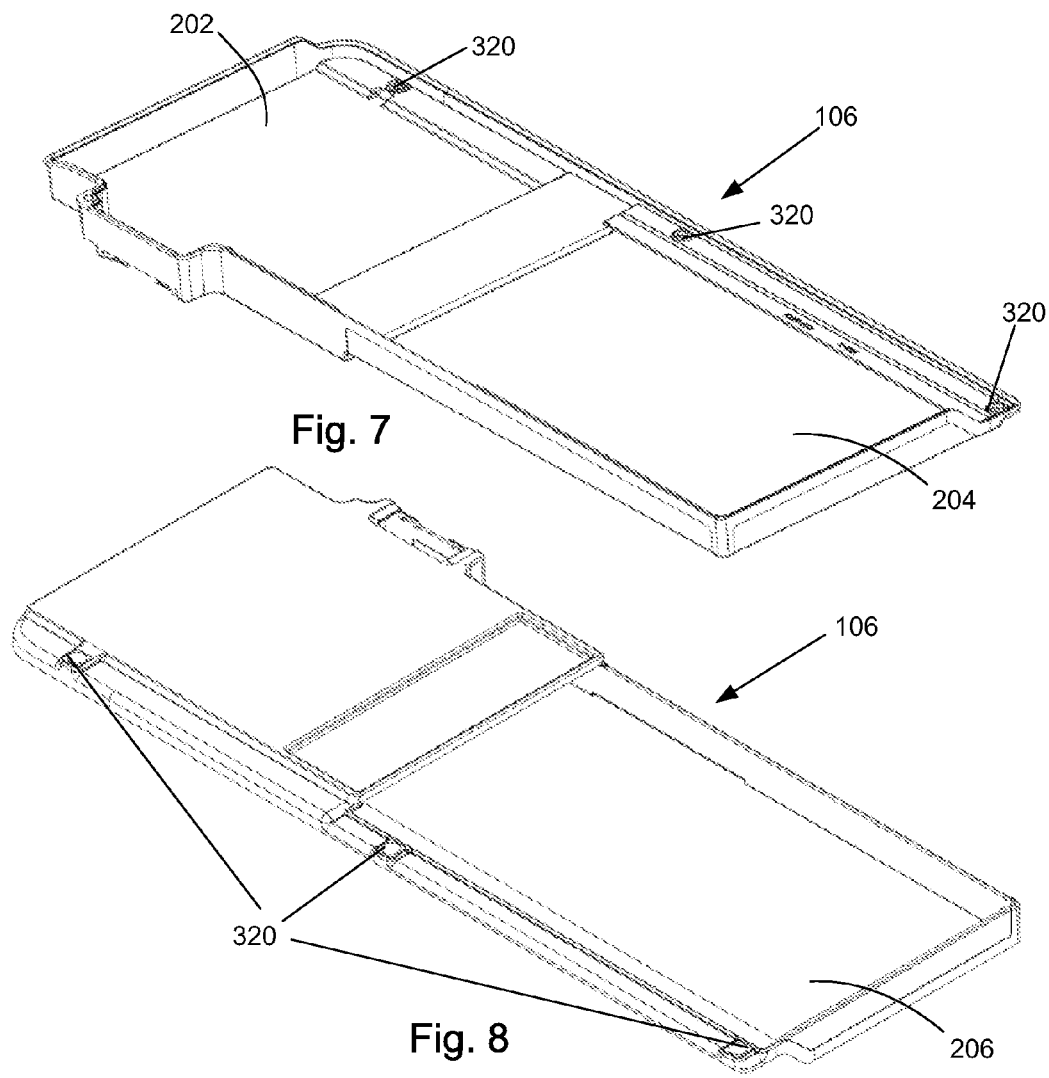

BATTERY PACK AND CONNECTOR

This application claims the benefit of co-pending U.S. Provisional Patent Application No. 61/184,795, filed on Jun. 6, 2009, which is hereby incorporated by reference herein in its entirety.

BACKGROUND

1. Field of the Invention

The present invention relates to small computers and, more particularly, to providing a compact battery pack capable of being embedded in a small computer, such as a laptop, notebook, etc.

2. Description of the Related Art

A battery pack is a set of any number of (preferably) identical batteries or individual battery cells. They may be configured in a series, parallel or a mixture of both to deliver the desired voltage, capacity, or power density.

Components of battery packs include the individual batteries or cells, and various interconnects which provide electrical conductivity between them. Rechargeable battery packs often contain a temperature sensor, which the battery charger uses to detect the end of charging. Interconnects are also found in batteries as they are the part which connects each cell, though batteries are most often only arranged in series strings.

Battery packs are widely used in portable applications such as laptop computers. However, it is important for any battery pack used in a laptop, notebook, or sub-notebook computer to be lightweight, sturdy, have high charge capacity, and compact. Moreover for a number of reasons it is advantageous for small computer manufacturers to be able to limit or entirely prevent unauthorized and/or unknowledgeable individuals from readily accessing the battery pack within the small computer. Such reasons, include for example, prevention of a user improperly disposing of battery packs that have outlived their usefulness, relaxation of mechanical requirements (such as a reduced need to meet a drop test consistent with a battery pack separated from the small computer being dropped). A typical user-removable battery should be able to withstand a one meter drop. That is, the battery should remain functional and safe after a one meter drop. Moreover, any battery made inaccessible to an unauthorized user can therefore be produced with thinner and lighter construction material since, unlike a battery pack removed from the small computer, the battery pack can be protected by the housing of the small computer and is therefore in less of a need to resist direct impacts from, for example, a drop event, direct blunt force, or exposure to moisture or other potentially corrosive materials.

Therefore, a battery pack that can be embedded in a small computer system having large charge capacity, and being lightweight and compact is desired.

SUMMARY

Broadly speaking, the embodiments described herein relate to a portable computing device, such as a laptop computer, and a compact, high charge capacity battery pack that can be embedded into the portable computing device. By embedding the battery pack in the small computing device, the battery pack can be manufactured using lighter materials than would otherwise be required for battery packs that are accessible to and thereby subject to trauma or other misuse or handling by unauthorized users and/or unknowledgeable users. In addition, since the battery pack is embedded in the small computing system, the battery pack can only be removed by an authorized user. The restricting of battery pack removal only by authorized users, such as an authorized repair technician, can be accomplished by providing tamper-resistant fasteners to fasten the battery pack to a computer housing. According to one aspect, a battery pack includes an electrical connector suitable for connecting the battery cells in the battery pack to circuitry external to the battery pack.

A method of embedding an assembled battery pack having a battery pack frame securely fastened to a battery pack cover by a number of tamper resistant fasteners into a small computing device housing is disclosed. The small computing device includes a single piece back portion and a single piece front portion having a cavity into which internal components are placed during assembly. The single piece front portion provides support for a plurality of user interaction components, wherein the battery pack frame is used to support a plurality of battery pack components including at least one battery cell and electrical interconnections. The battery pack cover includes a number of specially shaped recesses arranged to accommodate the tamper resistant fasteners in such a way as to prevent an unauthorized user from gaining meaningful access to the tamper resistant fasteners. The method can be carried out by the following operations: removing the back portion of the small computer housing, placing the battery pack into cavity of the single piece front portion, securing the battery pack to the single piece front portion, and electrically coupling the battery pack to an electrical connector.

A computing device is disclosed. The computing device includes at least a housing having a single piece front portion secured to a single piece back portion; electrical components of the computing device; and an embedded battery pack electrically coupled to the electrical components of the computing device, wherein the battery pack is secured to the single piece front portion with at least one tamper-resistant fastener.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which:

FIGS. 7 and 8 show top and bottom perspective views of a battery pack frame having a first portion and a recessed portion.

DETAILED DESCRIPTION OF THE DESCRIBED EMBODIMENTS

Broadly speaking, the described embodiments relate to a battery pack that can be embedded within a portable computing device, such as a laptop computer. The battery pack can have a high charge capacity and yet be sufficiently compact to provide for additional circuitry to be incorporated within a housing of the laptop computer while maintaining a thin profile of the portable computer. Moreover, by embedding the battery pack in the small computing device and making it substantially inaccessible to anyone but an authorized repair technician, the housing of the small computing device can provide additional protection to the battery pack since the battery pack can be considered to be an integral part of the small computing device. Therefore, by substantially eliminating unauthorized access (along with possible abuse by either negligence or lack of knowledge), the battery pack can be produced using lighter materials than would otherwise be required. The battery pack can also be customized to fit within the confines of the available space within the housing of the small computing device. In particular, by making the battery pack more compact as needed, more operational components can be assembled into the small computing device while still maintaining a thin profile.

Furthermore, by limiting access to the battery pack (or to the battery cells within the battery pack) to only authorized users, the environmental impact of improper disposal of battery packs can be minimized, if not completely eliminated. The restriction of battery pack access to only authorized users, such as a repair technician, can be accomplished by providing tamper resistant fasteners that fasten the battery pack to the housing of the computing device. In the described embodiments, the fasteners can only be removed using a special tool typically available only to authorized repair technicians. Furthermore, the battery pack cover (which would be that portion of the battery pack exposed to anyone opening the small computing device by removing a back portion of the small computer device housing) includes specially shaped recesses that limit access to the fasteners to a fastener tool that is designed to fit within the specially shaped recesses, thus making it even more difficult for an unauthorized user to gain access to the battery pack. According to one aspect, a battery pack includes an electrical connector suitable for connecting the battery cells in the battery pack to circuitry external to the battery pack.

Embodiments are discussed below with reference to FIGS. 1-16. However, those skilled in the art will readily appreciate that the detailed description given herein with respect to these figures is for explanatory purposes as the invention extends beyond these limited embodiments.

Figure 1:
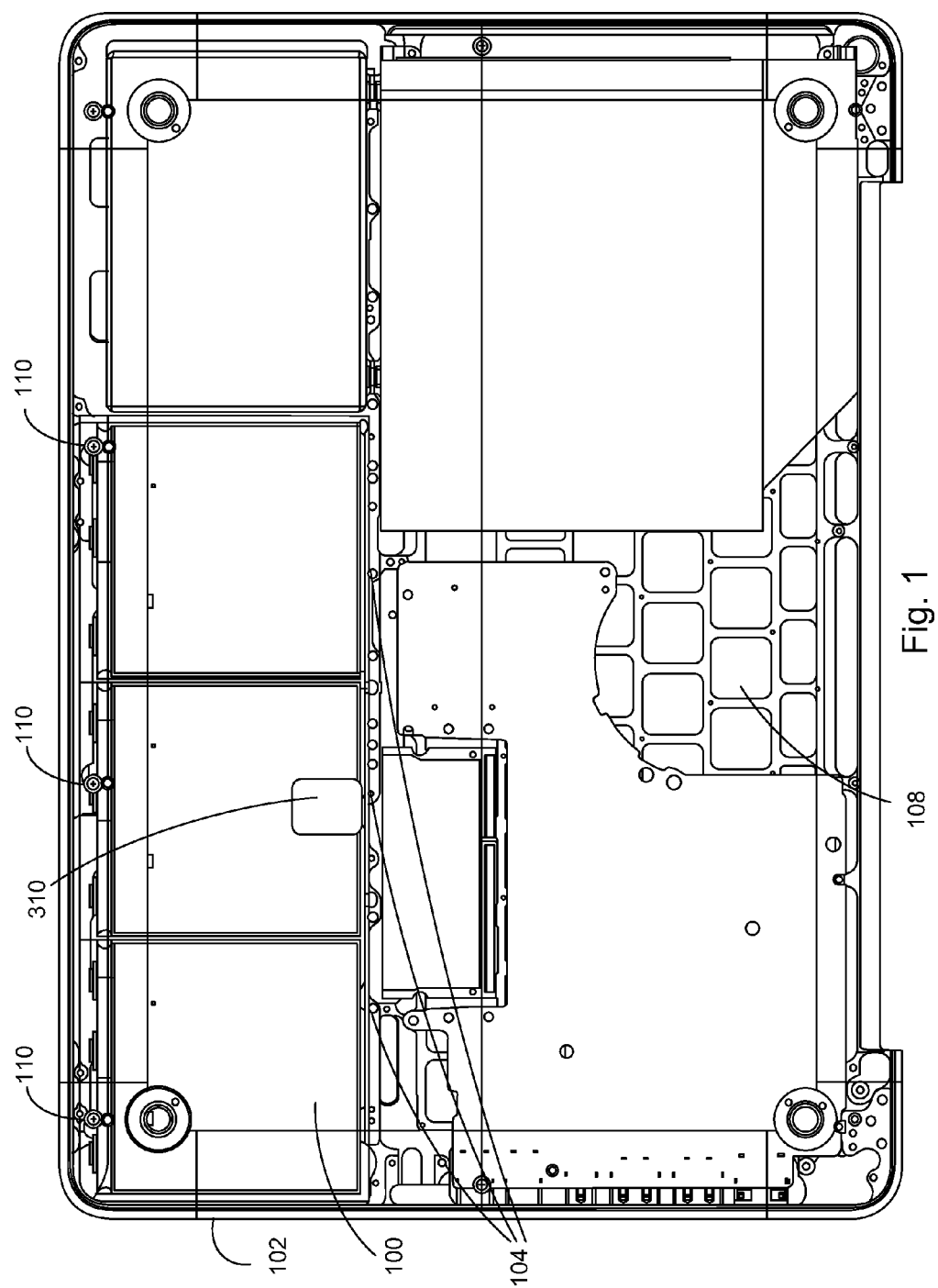
FIG. 1 is a top plan view showing a semi-transparent representation of an embodiment of a battery pack embedded in a front portion of a cut away view of a unibody housing for a laptop computer.

FIG. 1 shows a semi-transparent representation of the battery pack 100 in an exemplary laptop computer. FIG. 1 shows the front portion 102 of a computer housing in a cut away view of a laptop computer (in the cut away view, a removable back portion of the housing of the laptop computer has been removed for better visualization of the internal components, both structural and electronic). In the described embodiments, the battery pack 100 can be used to provide portable power for a laptop computer. Such laptop computers include, for example, a MacBook Pro manufactured by Apple Inc. of Cupertino, Calif. The battery pack 100 can provide all power required when the laptop computer is in a portable mode. In portable mode it is meant that the laptop computer is not connected to an external power supply, such as an AC outlet.

Figure 2:
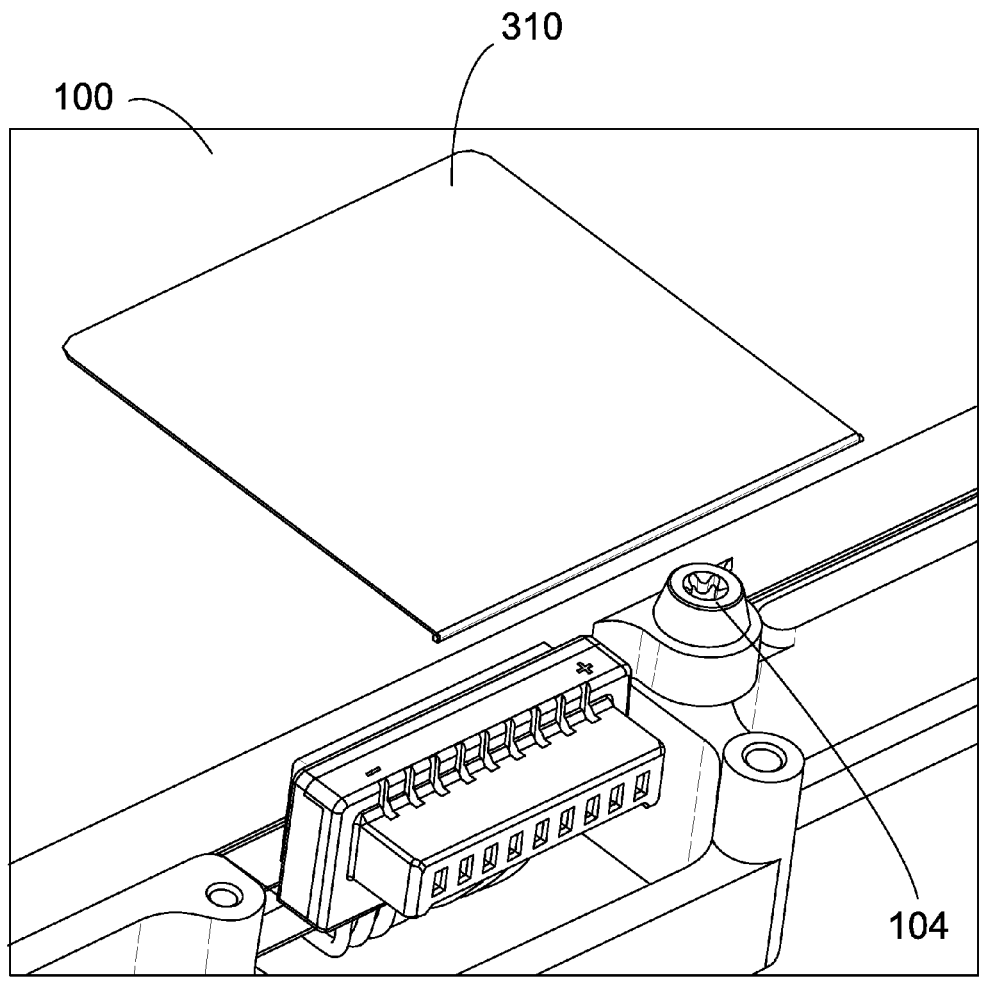
FIG. 2 is a detailed perspective view illustrating an embodiment of a tamper-resistant fastener.
Figure 3:
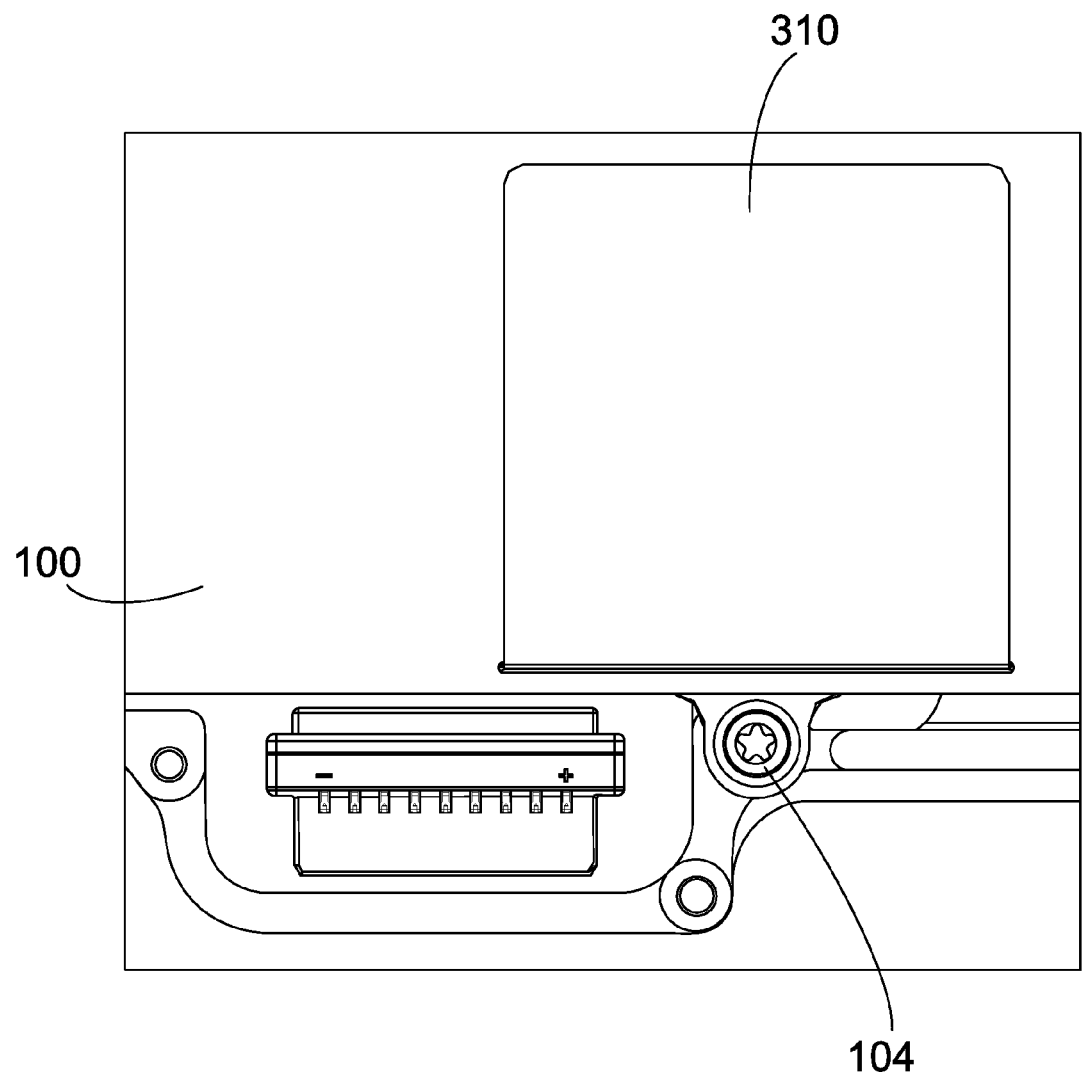
FIG. 3 is a detailed top plan view illustrating the embodiment of a tamper-resistant fastener shown in FIG. 2.
Figure 4:
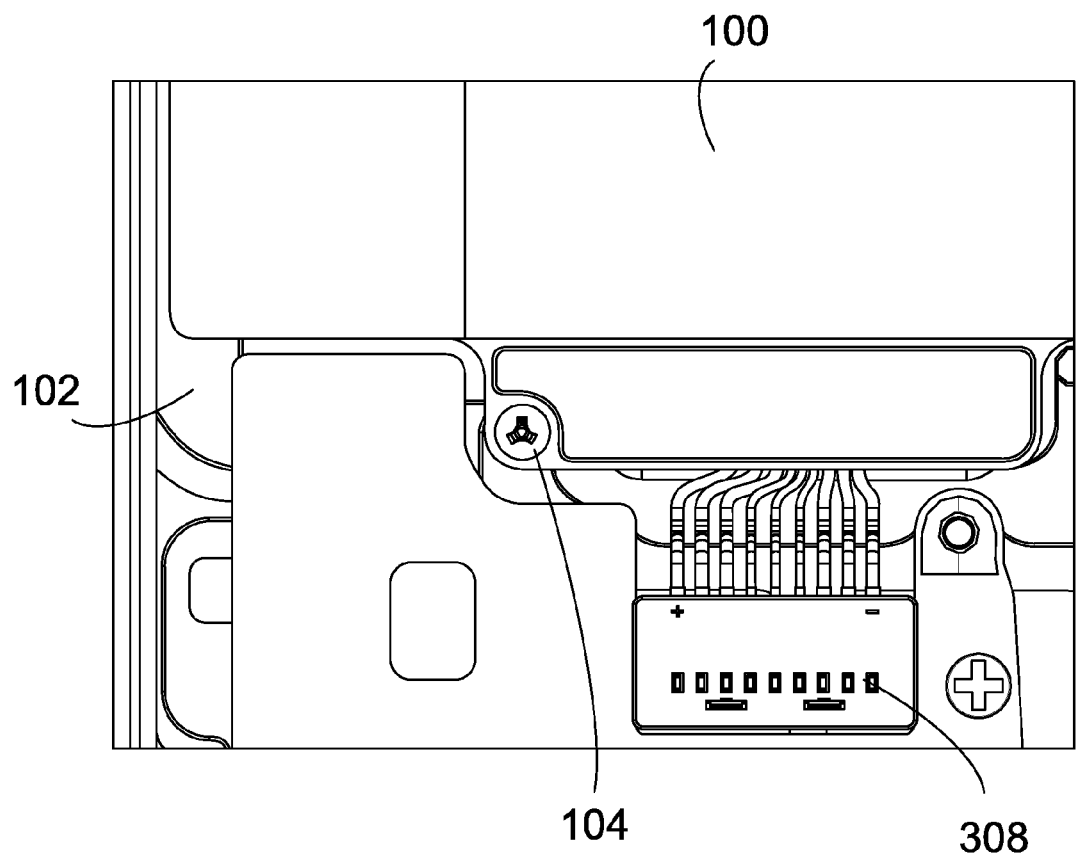
FIG. 4 is a detailed top plan view illustrating another embodiment of a tamper-resistant fastener.

Tamper-resistant fasteners 104 can be used to secure the battery pack 100 to the front portion 102 of the computer housing. A customized tool is required to manipulate the tamper-resistant fasteners 104. That is, the tamper-resistant fasteners are not configured to be manipulated by a conventional tool, such as a flat head or Phillips-head screwdriver or Allen wrench. FIGS. 2 and 3 illustrate an embodiment of a tamper-resistant fastener 104. As shown in FIGS. 2 and 3, this embodiment of the tamper-resistant fastener 104 has a head that is star-shaped. FIG. 4 illustrates another embodiment of a tamper-resistant fastener 104 with a head shaped like the letter "Y." It will be understood that other embodiments of the tamper-resistant fastener 104 can have other configurations such that the tamper-resistant fastener 104 cannot be manipulated by a conventional tool that is readily available to a typical user.

Figure 5:
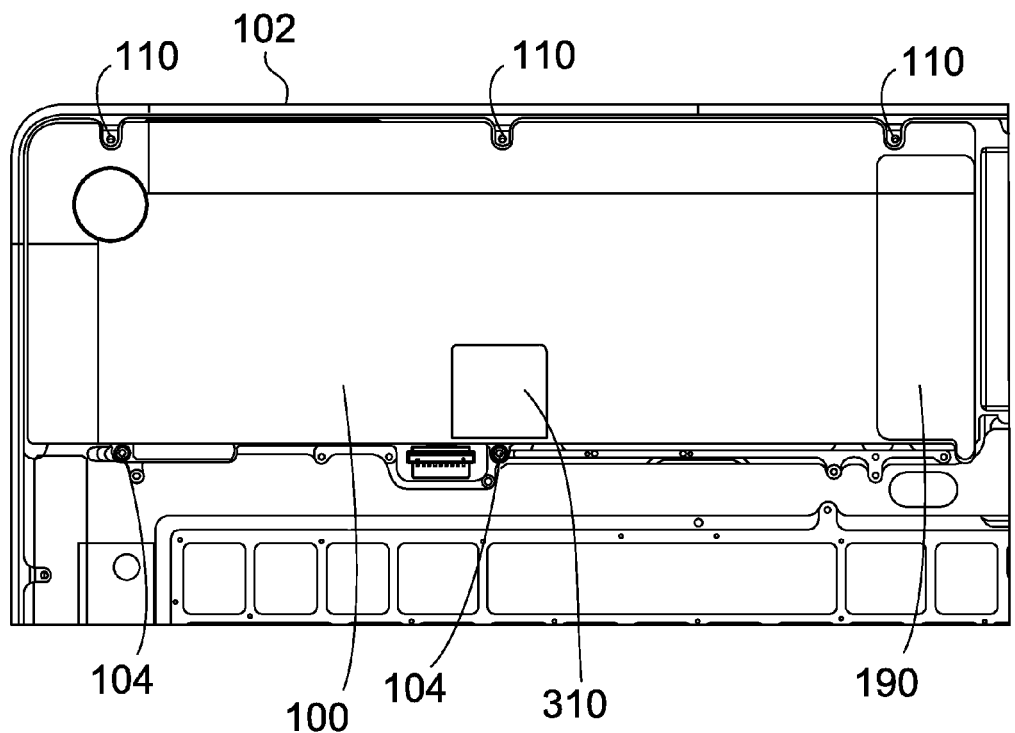
FIG. 5 is a top plan view of an embodiment of a battery pack, with a security tab, embedded in a front portion of a unibody housing for a laptop computer.
Figure 6:
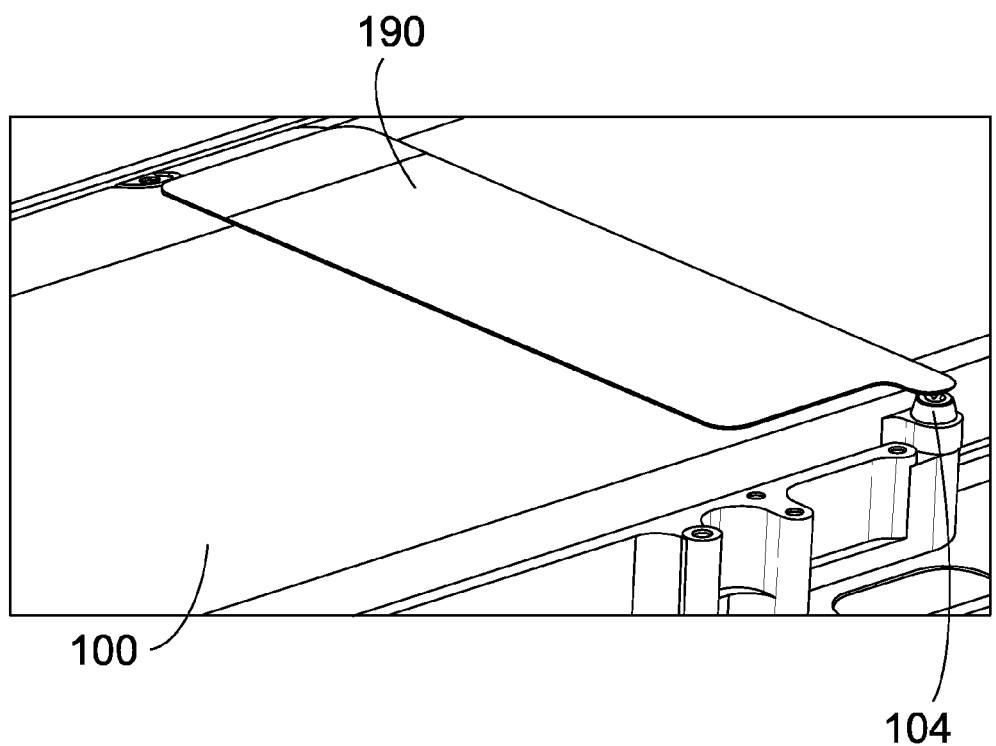
FIG. 6 is a detailed perspective view the security tab shown in FIG. 5.

In any case, since the battery pack 100 is securely attached to the front portion 102 of the computer housing using the tamper-resistant fasteners 104, the battery pack 100 can only be detached from the housing 102 by undoing the tamper-resistant fasteners 104 using the special tool (not shown). In this way, even in those circumstances where the battery pack 100 has been exposed to the external environment (by removing the back portion of the housing), the battery pack cover cannot be removed without the proper tool. In this way, unauthorized users are dissuaded from tampering with the battery pack 100. Moreover, a security tab 190, as shown in FIGS. 5 and 6, can be attached to the battery pack 100 and configured to indicate if the battery pack 100 has been removed from the housing 102 in an unauthorized manner. As illustrated in FIGS. 5 and 6, a portion of the security tab 190 can cover one or more of the tamper-resistant fasteners 104. Thus, only two of the tamper-resistant fasteners 104 are visible in FIG. 5 because the third tamper-resistant fastener is under the security tab 190. For example, the security tab 190 can be an adhesive film that cannot be re-applied once it has been removed. Therefore, to gain access to the tamper-resistant fastener 104 underneath the security tab 190, one must peel away the security tab 190. A label, such as a warning label, may also be printed on the security tab 190.

It should be noted that the computer housing may be a unibody housing. That is, the front portion 102 of the computer housing can be formed from a single block of metal, such as aluminum, providing strength without the bulk of more conventional laptop housings. Similarly, the back portion of the housing can also be formed from a single block of metal. As can be appreciated by the skilled artisan, aluminum is a durable yet lightweight metal. However, in order to maintain this aesthetic look and feel of a laptop computer having a thin profile, the amount of space available within the laptop housing is severely constrained. This is especially true since the battery pack 100 must conform to the external dimensions of the housing. For example, the front portion 102 can accommodate a keypad by providing a keypad support structure 108 as well as a touch pad and its associated circuitry (not shown). Therefore, the battery pack 100 must conform to these external shape and space requirements while at the same time provide a high charge capacity, long duty cycle, and a long battery life. As discussed in more detail below, the battery pack 100 can be customized to fit in the specific dimensions dictated by these requirements.

FIGS. 7 and 8 show top and bottom perspective views, respectively, of the battery pack frame 106, which can provide structural support for battery components 314. That is, FIG. 7 is a perspective view of the interior of the battery pack frame 106 and FIG. 8 is a perspective view of the exterior of the battery pack frame 106. As shown in FIG. 7, the battery pack frame 106 has a first portion 202 and a recessed portion 204. In the context of this discussion, the battery pack frame 106, first portion 202 and recessed portion 204 are designed to provide support for battery pack components 314, such as battery cells, electronics, etc. placed therein during a battery pack assembly operation. Once all such battery pack components 314 are placed within the respective cavities of the battery back frame 106, a battery pack cover 302, which is described in more detail below, can be positioned over and securely fastened to the battery pack frame 106.

Since the battery pack frame 106 can be placed in direct contact with the housing 102, there must be enough space available to accommodate a keyboard circuit (such as a keyboard membrane and associated circuitry) as well as the touch pad circuit and any other user interaction components and requirements dictated by the design and layout of the laptop computer. Therefore, a recessed portion 204 can be provided, which provides sufficient space for placement of the battery pack 100 within the front portion of the housing 102 with enough available space remaining to accommodate user interaction components, such as touch pad circuitry as well as any encroaching keyboard circuitry while still maintaining the thin profile of the device.

It should be noted that a thin profile has been found to be aesthetically pleasing to a large number of users and is therefore a desirable industrial design consideration in the manufacture of portable electronic devices, such as laptop computers. In the described embodiment, in order to protect battery pack components, such as sensitive electronics within the battery pack 100 as well as electrical connectors and battery cells, a protective layer 206 can be placed on the underside of the battery frame 106 over the battery pack components 314 in the recessed portion 204, as shown in FIG. 8. The protective layer 206 can be formed of any of a number of materials, such as stainless steel (SUS), MYLAR (a polyester film), etc. In the case where the protective layer is SUS or MYLAR, the layer can have a thickness on the order of about 0.1 mm in order to provide protection for battery pack components 314 contained in the recessed portion 204. This protective layer 206 can be thin because it is not user-accessible when the assembled battery pack 300 having a battery pack cover 302 is installed in the computer even if the back portion (not shown) of the computer housing is removed, as the protective layer 206 is on the underside of the battery pack frame 106 adjacent electrical components of the computer. As one of skill in the art will appreciate, a thin protective layer 206 allows more space for not only battery pack components 314 in the recessed portion but also for components of the computer.

Figure 9:
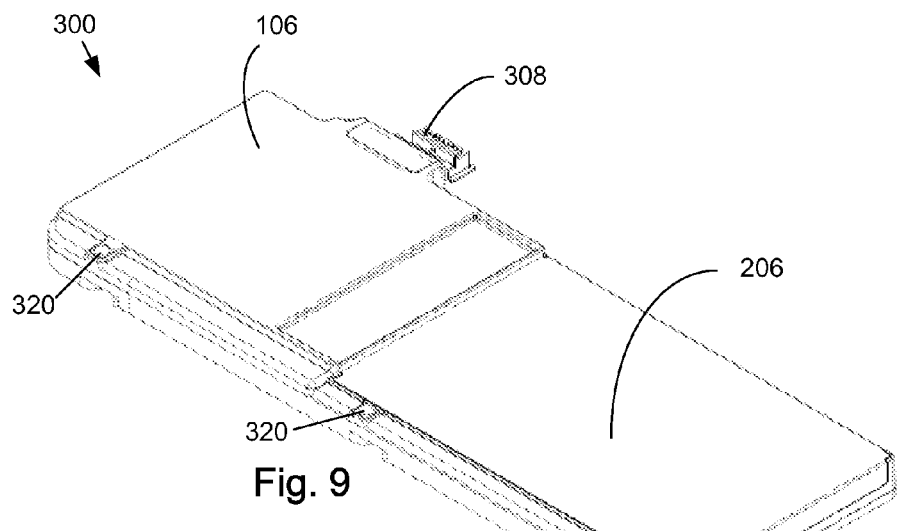
FIGS. 9 and 10 are top and bottom perspective views of an assembled battery pack.
Figure 10:
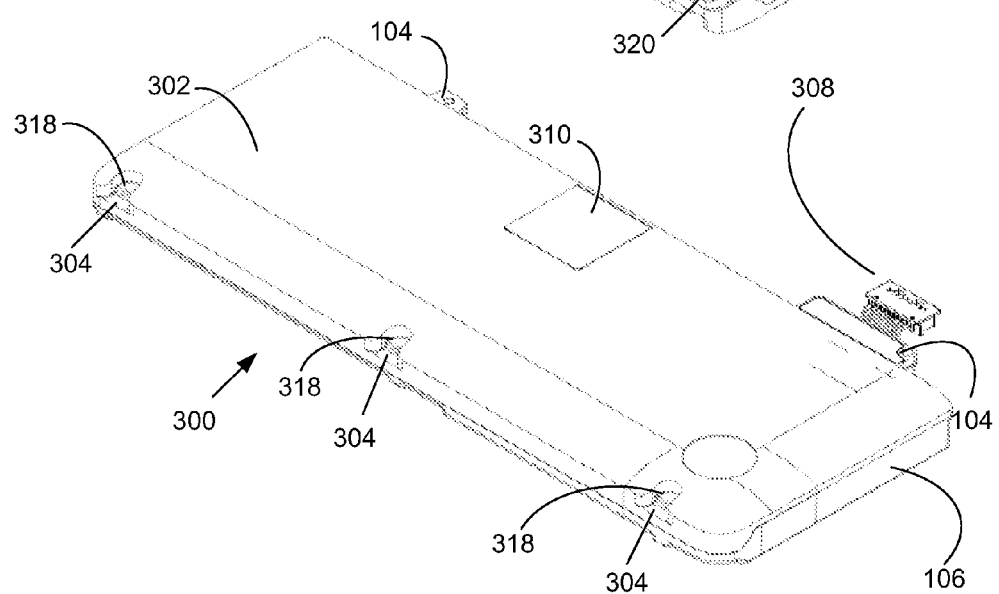

FIGS. 9 and 10 are top and bottom perspective views, respectively, of an assembled battery pack 300 having a battery pack cover 302 secured to the battery pack frame 106. In an embodiment, the battery pack cover 302 is laminated to the battery pack frame 106 to enclose the battery pack components 314. In another embodiment, the battery pack cover 302 is secured to the battery pack frame 106 with an adhesive. The battery pack frame 106 and the battery pack 302 can be injection molded to have adhesive channels and mating surfaces along the edges for applying adhesive to secure the two parts together to form an assembled battery pack 300 containing battery pack components 314 therein. Other methods of attaching the battery pack cover 302 to the battery pack frame 106 can also be used. For example, screws can be used to secure the battery pack cover 302 to the battery pack frame 106.

As shown in FIG. 10, tamper-resistant fasteners 104 are provided on the battery pack cover 302 to secure the assembled battery pack 300 to the front portion 102 of the computer housing such that the battery pack 300 can be removed only by an authorized technician, as discussed above. Although only two tamper-resistant fasteners 104 are shown in the embodiment illustrated in FIG. 10, it will be understood that the assembled battery pack 300 may have any number of tamper-resistant fasteners 104. For example, there are three tamper-resistant fasteners 104 in the embodiment shown in FIG. 1. It will be understood that any number of tamper-resistant fasteners 104 may be provided. In some embodiments, the tamper-resistant fasteners 104 are threaded through holes 330 (FIG. 12) in the battery pack cover 302 or the battery pack frame 106 or both. In other embodiments, the tamper-resistant fasteners 104 may be an integral part of the battery pack cover 302. The tamper resistant fasteners 104 may also be provided in specially shaped recesses in such a way as to prevent an unauthorized user from gaining meaningful access to the tamper resistant fasteners 104.

Figure 11:
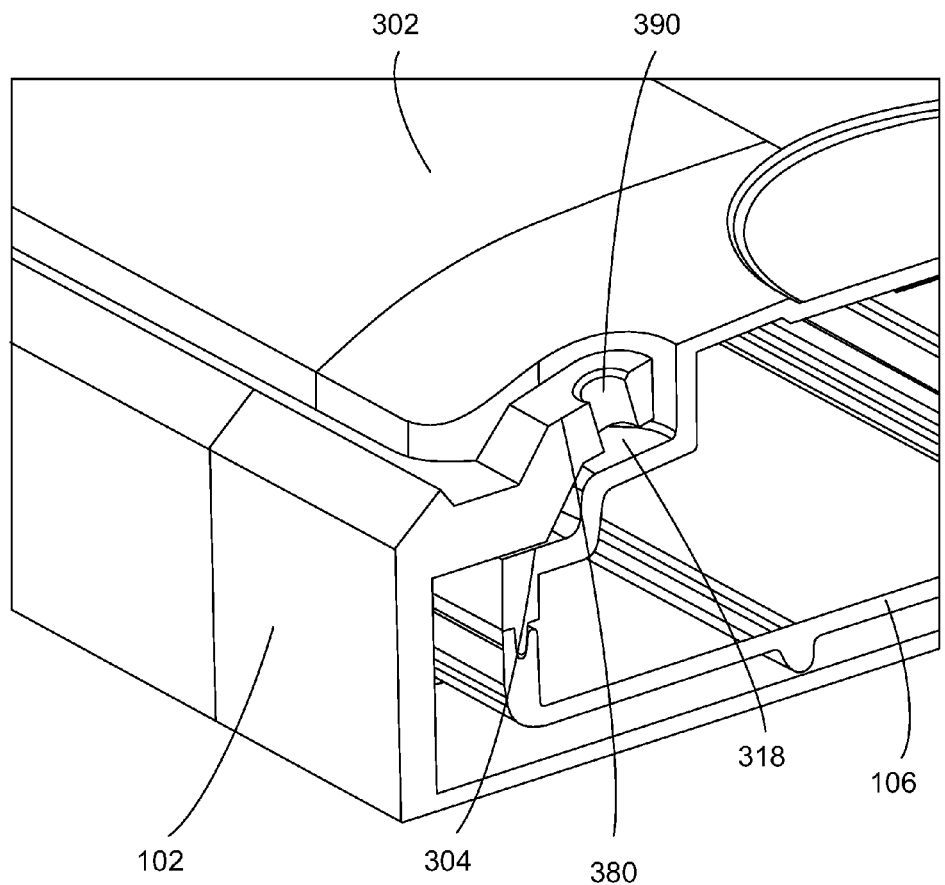
FIG. 11 is a perspective cross-sectional view of an embodiment of a battery pack embedded in a front portion of unibody housing for a laptop computer.

As shown in FIGS. 10 and 11, the battery pack cover 302 has a number of corresponding inserts 318 into which fasteners 110, such as conventional screws, may be inserted to attach the battery pack 100 to the front portion 102 of the computer housing. It will be understood that conventional screws may be threaded into the inserts 318 in certain embodiments and other types of fasteners, such as customized tamper-resistant fasteners 104, may be used to secure the battery pack 100 to the front portion 102 of the computer housing in these locations. In the illustrated embodiment, there are three such inserts 318 in the battery pack cover 302. In other embodiments, there may be more or fewer inserts 318.

As shown in the illustrated embodiment of FIG. 10, the inserts 318 in the battery pack cover 302 are each seated in a recess 304. The recesses 304 allow the battery pack 100 to be placed into the front portion 102 of the housing such that a corresponding tab 380 of the housing is inserted into each of the recesses 304, as shown in FIG. 11. Each of the tabs 380 can have a through-hole 390 corresponding to the insert 318 of the battery pack cover 302. Once in place, the screws 110 (or other type of fasteners) may be tightened to help secure the battery pack 100 to the front portion 102 of the housing. It will be understood that, according to this embodiment, the battery pack 100 is installed by first inserting the end with the inserts 318 into the computer such that the tabs 380 of the housing are inserted into the recesses 304. In some embodiments, the recesses 304 can be specially shaped recesses that accommodate the fasteners 110 in such a way as to prevent an unauthorized user from gaining meaningful access to the fasteners 110.

Figure 12:
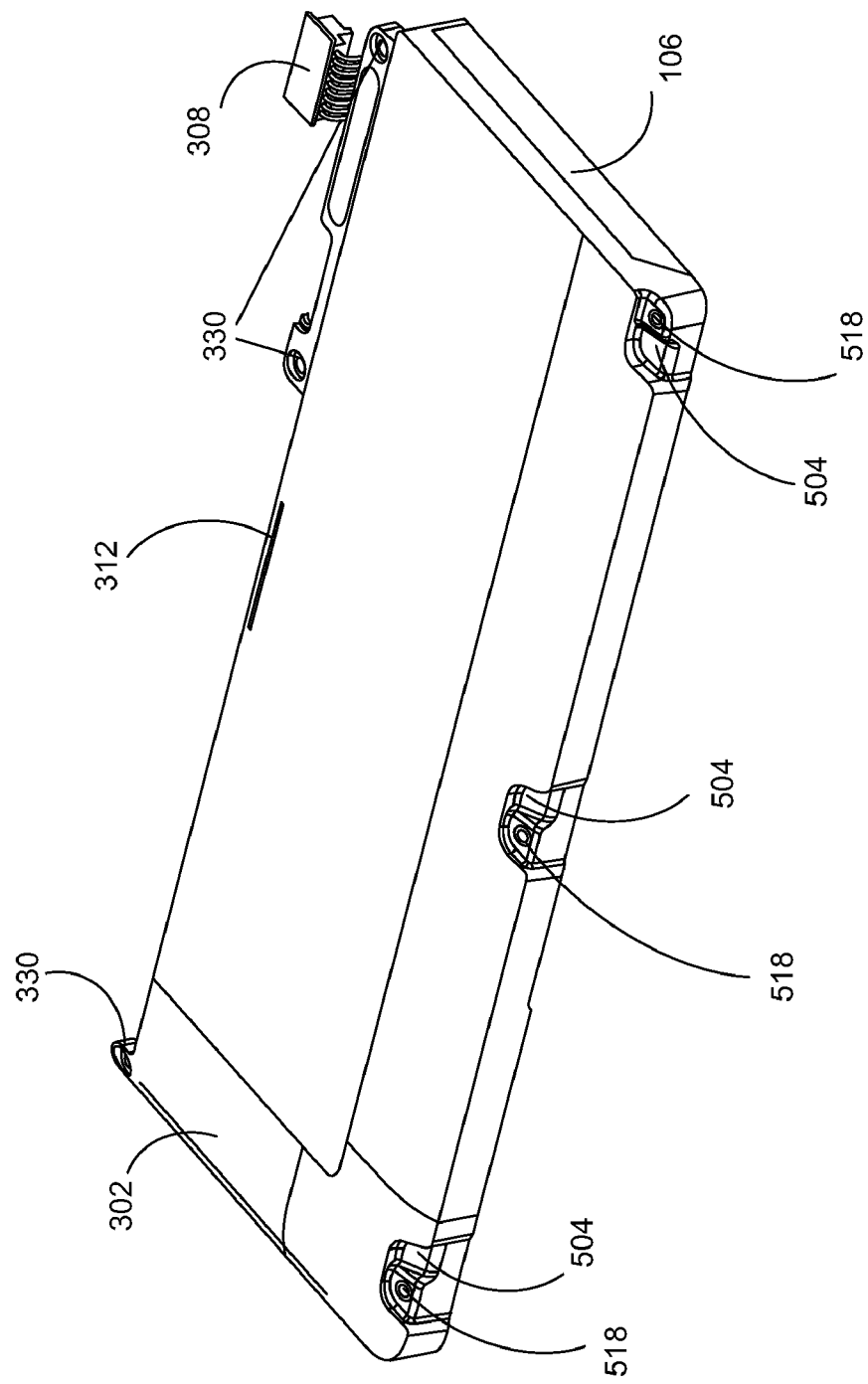
FIG. 12 is an embodiment of a battery pack having an insert in a recess to help secure the battery pack to a back portion of a unibody housing for a laptop computer.

In some embodiments, as shown in FIGS. 7-9, the battery pack frame 106 can have a number of compressible feet 320, which can be formed of a rubber material, to provide an interference fit of the recesses 304 and the tabs 380 of the front portion 102 of the computer housing. In still other embodiments, fasteners are not used for securing the battery pack 100 to the front portion 102 in these locations, but rather for securing the front portion 102 to the back portion (non shown) of the computer housing. That is, a fastener is threaded through the through-hole 390 in the tab 380 of the front portion 102 of the housing and through a corresponding through-hole in the back portion (not shown) of the housing. FIG. 12 shows another embodiment of a battery pack in which inserts 518 are incorporated in recesses 504 to help secure the battery pack 300 to the back portion (not shown)) of the housing. It will be understood that either tamper-resistant fasteners 104 or conventional screws 110 may be used in these locations.

Figure 13:
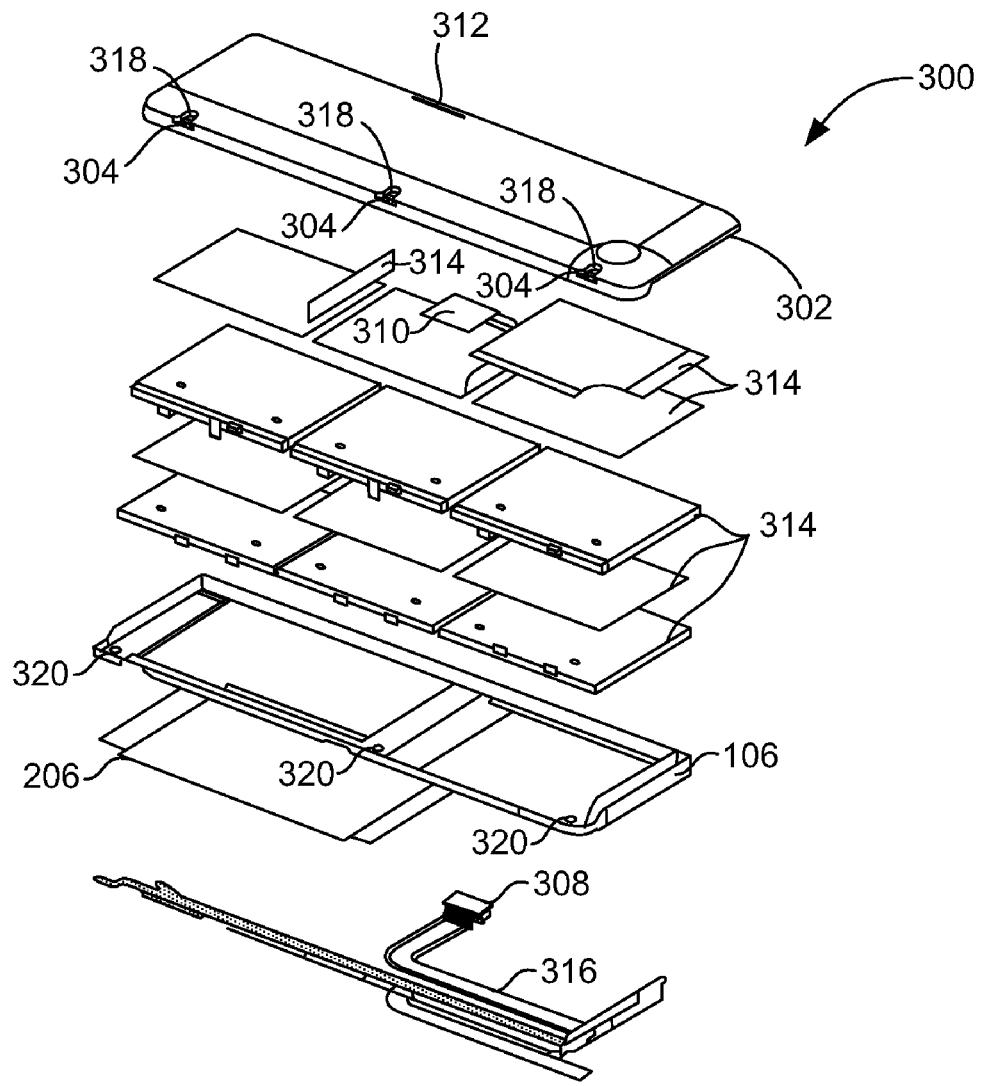
FIG. 13 is an exploded perspective view of an assembled battery pack.

FIG. 13 is an exploded perspective view of an embodiment of the assembled battery pack 300. Although the cables 316 associated with the electrical connector 308 are illustrated as being positioned underneath the battery pack frame 106 in this embodiment, the skilled artisan will appreciate that the cables 316 could be positioned between the battery pack frame 106 and battery pack cover 302 or even over the top of the battery pack cover 302 in other embodiments.

In the described embodiment, the battery pack cover 302 can be placed within the housing 102 in such a way that when the back portion (not shown) of the computer housing is removed, it is the battery pack cover 302 that is exposed to the external environment. Accordingly, the battery pack cover 302 can be formed of a durable material, such as high impact plastic or other suitably rugged yet lightweight material. The battery pack frame 106 and battery pack cover 302 can both be injection molded plastic, such as PC/ABS plastic. In some embodiments, the battery pack frame 106 and battery pack cover 302 can have a thickness in a range of about 0.35 mm to about 1.3 mm. In other embodiments, the battery pack frame 106 and battery pack cover 302 can have a thickness in a range of about 0.6 mm to about 0.65 mm. In this way, when the back portion of the computer housing is removed, an authorized user can only remove the fasteners 104 with an appropriately shaped tool available only to authorized technicians. The durable material of the battery pack cover 302 is capable of protecting the battery cells from incidental damage.

However, the material of the battery pack cover 302 need not be as durable and rugged as the material used for conventional laptop battery packs because the battery pack 100 cannot be removed by a typical user who does not have access to the special tool required for the fasteners 104. Thus, the battery pack 100 need not meet a stringent drop test. Furthermore, because a user cannot remove the battery pack 100 without a customized tool, the battery pack 100 does not need additional mechanisms, such as latches, that are typically included in a conventional battery pack designed to be removed and inserted by a user. Without these additional mechanisms, the battery pack 100 can be made even smaller, or the battery pack 100 can accommodate larger battery cells and thereby increase charge capacity. Furthermore, because the battery pack 100 can last as long as about eight hours and can be recharged as many as about 1000 times, there is less need for a user to replace the battery pack 100.

As shown in the illustrated embodiments, the assembled battery pack 300 can have a substantially rectangular shape. According to an embodiment, the battery cell or cells within the battery pack 300 can have a customized size and shape designed to fit inside a housing 102 having a thin profile. The thickness of a conventional battery pack is typically dictated by the diameter of the cylindrical lithium-ion cells contained within the battery pack. Also, the space between the cylindrical cells is wasted in a conventional battery pack. However, the battery cells, according to this embodiment, can be customized such that there is no wasted space between cells and the thickness of each cell can be customized to fit in the designated space within the battery pack 300, thereby maintaining the overall volume of the battery cells even through the cells are thinner. The thickness of the computer housing is therefore not dictated by the size of the battery cells, whether cylindrical or otherwise. According to some embodiments, the computer has a housing (front portion 102 and back portion (not shown)) that is thinner than a conventional lithium-ion cell. For example, a conventional lithium-ion cell is a cylindrical cell with a 18 mm diameter. However, the thickness of housing (front portion 102 and back portion (not shown)) of a laptop computer containing a battery pack 100, as described herein, can have a thickness of about 16 mm or less. The battery packs 100 described herein can have thicknesses in a range of about 5 mm to about 14 mm.

As discussed above, the battery cells within the battery pack 100 are capable of having a high charge capacity, which translates into longer running time and less need to swap a depleted battery for a fully charged battery. By removing the bulky housing of a typical battery pack, the battery pack can have a larger volume, and therefore, have a higher charge capacity, while maintaining a thin profile. Furthermore, embedding the battery pack 100 within the computer so that it cannot be removed by the user removes the need for a battery door on the computer housing, thereby simplifying the manufacture of the computer housing as there is no need for a battery door and its associated latches, hinges, etc. In one embodiment, the battery pack 100 is capable of providing power to a laptop computer for up to about eight hours and can be recharged up to about 1000 times, thereby providing a longer lifespan for the battery pack 100. As the skilled artisan will readily appreciate, one recharge is a complete charge and discharge of a battery's energy. The longer lifespan of the battery pack 100 also makes it more environmentally friendly than conventional battery packs, which are designed to be replaced after a couple of years. With the use of the longer lifespan battery packs 100 described herein, fewer batteries will be discarded. The tamper-resistant feature also makes it more difficult for a user to simply remove the battery and improperly discard the battery without recycling it. It will be understood that although that battery pack is not user-removable, the user can still have access to other electronic components of the computer if the back portion of the computer housing is removed. The battery pack 100 can have an energy capacity of at least 60 watt hours. In another embodiment, battery pack 100 can have an energy capacity of at least 73 watt hours. In still another embodiment the battery pack 100 can have an energy capacity of at least 94 watt hours.

The assembled battery pack 300 can be used to provide support for the individual batteries or cells and various interconnects that provide electrical conductivity between them. In order to communicate with circuits external to the battery pack 100, an electrical connector 308 is used. For example, the electrical connector 308 can be connected to the motherboard of the computer. In this way, power can be delivered from battery cells within the battery pack 100 to external circuits in the computer. Moreover, external power can be provided by way of the electrical connector 308 to the battery cells within battery pack 100 from an external power supply. Such external power can be used at least for recharging of the battery cells within battery pack 100. The skilled artisan will understand that the configuration and position of the electrical connector 308 on the assembled battery pack 300 will depend on the specific configuration of the electrical components to which it is connected, and that such configuration may differ from one computer to another.

Figure 15:
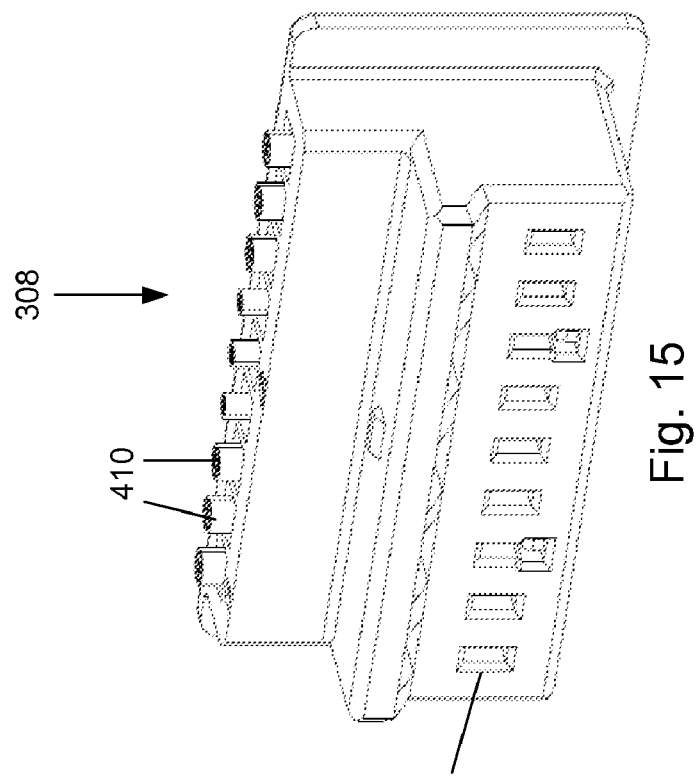
FIGS. 14 and 15 are perspective views of the front and back of an electrical connector.
Figure 14:
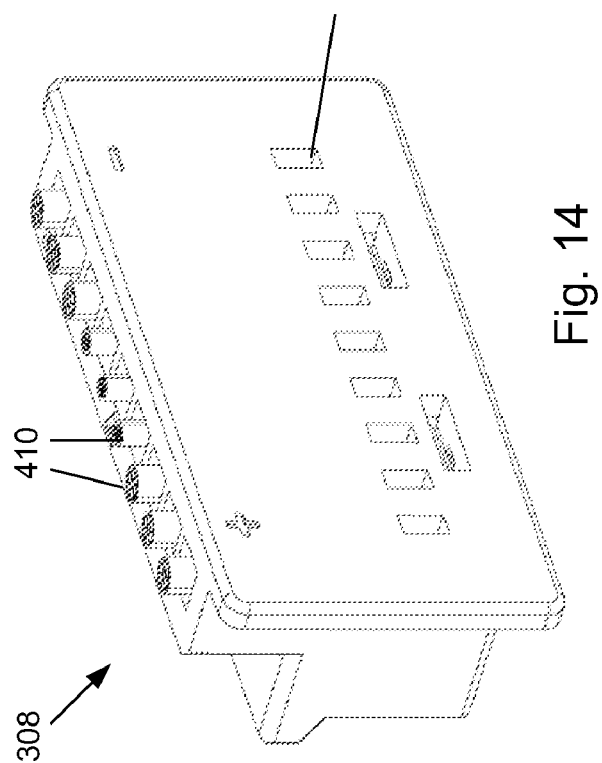

FIGS. 14 and 15 are perspective views of the front and back of an embodiment of an electrical connector 308. The electrical connector 308 can be used to electrically couple the battery pack 100 to electrical components of the computer external to the battery pack 100. That is, the electrical connector 308 connects circuits external to the battery pack 100 with the circuits and battery cells internal to the battery pack 100.

When the battery pack 100 is installed in the computer, the electrical connector 308 can be coupled to the electrical components of the computer before inserting the battery pack 300 into the designated space within the housing of the computer. Thus, the electrical connector 308 is under the battery pack 300 and is not user-accessible. Once inserted into the designated space, the tamper-resistant fasteners may be implemented to secure the battery pack 300 to the front portion 102 of the housing. Thus, once the battery pack 300 is installed in the computer, the electrical connector 308 and its associated wires and cables 316 are protected underneath the battery pack 300 even when the back portion of the computer housing is removed and the battery pack 300 is exposed. In the illustrated embodiment, the electrical connector 308 has nine pin connection receptors, 400 for coupling to the electrical components of the computer. According to another embodiment, the battery connector has 13 pin connection receptors 400. As shown in FIGS. 8 and 9, there are also a number of connectors 410 for coupling to the battery pack 300 via wires and cables 316.

Figure 16:
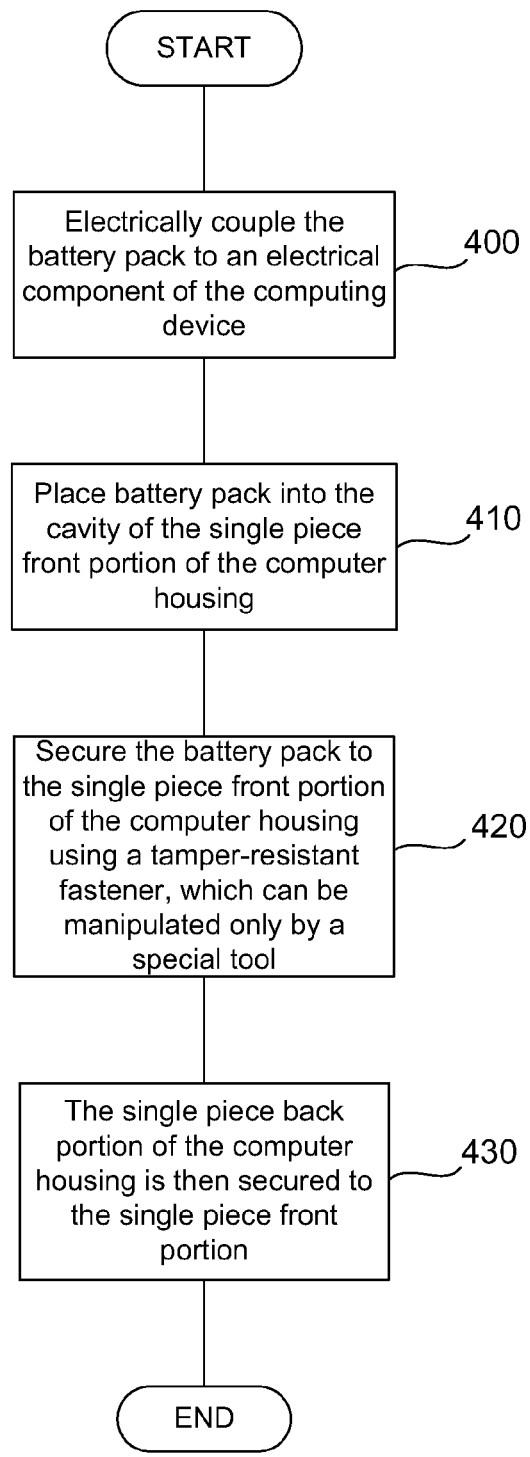
FIG. 16 is a flow chart of a method of embedding an assembled battery pack into a computing device housing.

FIG. 16 is a flow chart of a method of embedding an assembled battery pack 300 into a computing device having a housing comprising a single piece back portion and a single piece front portion. As discussed above, the assembled battery pack 100 has a battery pack frame 106 securely fastened to a battery pack cover 302 by at least one tamper-resistant fastener 104. The single piece front portion 102 has a cavity into which internal components are placed during assembly and also provides support for a plurality of user interaction components. In step 400, the battery pack 300 is electrically coupled to an electrical component of the computing device. The battery pack 300 is then placed into the cavity of the single piece front portion 102 in step 410. After the battery pack 300 is positioned in the cavity, the battery pack 300 is secured to the single piece front portion 102 using the tamper-resistant fastener 104, which can be manipulated only by a special tool in step 420. The single piece back portion of the computer housing is then secured to the single piece front portion 102 in step 430.

It will be understood that, in other embodiments, the battery pack 300 can be electrically coupled to an electrical component of the computing device after the battery pack 300 is placed into the cavity of the single piece front portion 102. That is, the order of the steps 400 and 410 can be reversed.

As shown in the illustrated embodiments, a pull tab 310 may be provided on the assembled battery pack 300 to aid an authorized technician in removing the assembled battery pack 300 from the housing 102 after the tamper-resistant fasteners 104 are removed. It will be understood that, in the illustrated embodiment, the fasteners 110 should also be removed before the pull tab 310 is used to first remove the battery pack 300. As shown in FIG. 13, the pull tab 310 can be attached to a battery component and threaded through a slot 312 in the battery pack cover 302. According to an embodiment, the pull tab 310 is capable of supporting the weight of the computer.

The advantages of these embodiments are numerous. Different aspects, embodiments or implementations may yield one or more of the following advantages. One advantage is that the battery pack is not readily accessible to any but an authorized user. Since the battery pack is embedded in the small computing device, the housing of the small computing device provides protection that would otherwise be required if the battery pack was readily removable. In this way, the battery pack can be made of less rugged material, lighter material, thereby reducing the overall weight of the battery pack without compromising safety, durability, or the environment.

The many features and advantages of the described embodiments are apparent from the written description and, thus, it is intended by the appended claims to cover such features and advantages. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A thin battery pack integrally embedded into a portable computing device, comprising:
    a battery pack frame configured to provide structural support to battery pack components included therein,
    wherein the battery pack frame comprises a recessed portion that reduces an overall thickness of the battery pack so as to provide additional space for internal components of the portable computing device other than those related to the battery pack, and an opening located over a portion of the recessed portion, the opening reducing an overall weight of the battery pack frame;
    a lightweight, thin and flexible protective layer covering the opening arranged to provide a barrier between the battery pack components and an interior environment of the portable computing device; and
    a battery pack cover secured to the battery pack frame, comprising:
    at least one tamper resistant fastener configured to secure the battery pack cover directly to a housing of the portable computing device and the battery pack frame such that the at least one tamper resistant fastener prevents an unauthorized release of the battery pack into an external environment.

2. The battery pack as recited in claim 1, further comprising an electrical connector arranged to electrically connect circuits external to the battery pack with circuits and battery cells internal to the battery pack.

3. The battery pack as recited in claim 1, wherein the protective layer has a thickness of about 0.1 mm.

4. The battery pack as recited in claim 1, wherein the protective layer comprises a polyester film.

5. The battery pack as recited in claim 1, wherein the protective layer comprises stainless steel.

6. The battery pack as recited in claim 1, wherein the battery pack cover is secured to the battery pack frame with adhesive.

7. The battery pack as recited in claim 1, wherein the battery pack cover has a thickness of less than about 1.3 mm.

8. The battery pack as recited in claim 1, wherein the battery pack is embedded in a computing device, comprising:
    a housing having a single piece front portion secured to a single piece back portion; and
    electrical components of the computing device,
    wherein the battery pack is secured to the single piece front portion with at least one tamper-resistant fastener.

9. The battery pack as recited in claim 8, wherein the at least one tamper-resistant fastener can be manipulated only by a customized tool.

10. The battery pack as recited in claim 8, wherein the battery pack comprises at least one battery cell having a shape and size customized to fit in a cavity of the single piece front portion.

11. The battery pack as recited in claim 8, wherein the battery pack has a thickness of less than about 14 mm.

12. The battery pack as recited in claim 8, further comprising an electrical connector for electrically coupling the battery pack to the electrical components of the computing device, wherein the electrical connector is positioned between the battery pack and the single piece front portion.

13. The battery pack as recited in claim 8, wherein the battery pack comprises a protective layer adjacent electrical components of the computing device, wherein the protective layer has a thickness of about 0.1 mm or less.

14. The battery pack as recited in claim 8, wherein the battery pack includes at least one specially shaped recess arranged to accommodate the at least one tamper-resistant fastener in such a way as to allow removal of the at least one tamper resistant fastener only with a customized tool.

* * * * *